United States Patent
Tregger et al.

(10) Patent No.: US 10,329,202 B2
(45) Date of Patent: Jun. 25, 2019

(54) POST-BATCHING CMA DOSING INTO CONCRETE

(71) Applicant: VERIFI LLC, Cambridge, MA (US)

(72) Inventors: Nathan A. Tregger, Northborough, MA (US); Mark F. Roberts, North Andover, MA (US); Kati Hazrati, Boston, MA (US)

(73) Assignee: VERIFI LLC, Cambridge, MA (US)

( * ) Notice: Subject to any disclaimer, the term of this patent is extended or adjusted under 35 U.S.C. 154(b) by 383 days.

(21) Appl. No.: 15/170,199

(22) Filed: Jun. 1, 2016

(65) Prior Publication Data

US 2016/0355441 A1 Dec. 8, 2016

Related U.S. Application Data

(60) Provisional application No. 62/170,951, filed on Jun. 4, 2015.

(51) Int. Cl.
| | |
|---|---|
| *B28C 7/02* | (2006.01) |
| *C04B 14/10* | (2006.01) |
| *C04B 24/12* | (2006.01) |
| *C04B 24/26* | (2006.01) |
| *C04B 28/02* | (2006.01) |
| *C04B 40/00* | (2006.01) |
| *C04B 103/30* | (2006.01) |
| *C04B 103/32* | (2006.01) |

(52) U.S. Cl.
CPC .......... *C04B 40/0032* (2013.01); *B28C 7/024* (2013.01)

(58) Field of Classification Search
CPC .......................... C04B 40/0032; B28C 7/024
See application file for complete search history.

(56) References Cited

U.S. PATENT DOCUMENTS

| | | |
|---|---|---|
| 3,998,437 A | 12/1976 | Kitsuda et al. |
| 4,471,100 A | 9/1984 | Tsubakimoto et al. |
| 5,661,206 A | 8/1997 | Tanaka et al. |

(Continued)

FOREIGN PATENT DOCUMENTS

| | | |
|---|---|---|
| WO | 2009127893 | 10/2009 |
| WO | 2010040796 | 4/2010 |
| WO | 2010112784 | 10/2010 |

OTHER PUBLICATIONS

Copenheaver, Form PCT/ISA/220, International Search Report for PCT/US2016/035221, dated Sep. 14, 2016, 2 pages.

(Continued)

*Primary Examiner* — Charles Cooley
(74) *Attorney, Agent, or Firm* — Craig K. Leon (57) ABSTRACT

Disclosed are dosing methods for mitigating the deleterious effect of clays, which are born or conveyed by sand aggregates, crushed rock, gravel, and other aggregates used in the manufacture of concrete, upon the dosage efficiency of cement dispersants added into concrete. Instead of introducing the entire cement mitigation agent (CMA) into the aggregate material at a quarry or upon batching in the mix plant in a singular, upfront dose, the present invention comprises combining at least 51% and up to 100%, and, most preferably, at least 75% and up to 100%, of the total dosage amount of the CMAs into a given concrete mix batch during the transit portion of the delivery between initial batching at the mix plant and the pour event at the job site.

20 Claims, 4 Drawing Sheets

(56) References Cited

U.S. PATENT DOCUMENTS

| | | | |
|---|---|---|---|
| 5,713,663 A * | 2/1998 | Zandberg | B01F 15/00201 366/142 |
| 6,042,258 A * | 3/2000 | Hines | B28C 7/024 366/8 |
| 6,352,952 B1 | 3/2002 | Jardine et al. | |
| 6,569,234 B2 | 5/2003 | Yamashita et al. | |
| 6,670,415 B2 | 12/2003 | Jardine et al. | |
| 8,020,431 B2 * | 9/2011 | Cooley | B28C 5/422 366/1 |
| 8,118,473 B2 * | 2/2012 | Compton | B28C 5/422 366/17 |
| 8,257,490 B2 | 4/2012 | Alain et al. | |
| 8,311,678 B2 | 11/2012 | Koehler et al. | |
| 8,461,245 B2 | 6/2013 | Kuo et al. | |
| 8,491,717 B2 | 7/2013 | Koehler et al. | |
| 8,561,488 B2 | 10/2013 | Jacquet et al. | |
| 8,727,604 B2 * | 5/2014 | Compton | B28C 5/422 366/142 |
| 8,746,954 B2 * | 6/2014 | Cooley | B28C 5/422 366/143 |
| 8,764,272 B2 | 7/2014 | Hazrati et al. | |
| 8,764,273 B2 | 7/2014 | Koehler et al. | |
| 8,818,561 B2 * | 8/2014 | Koehler | G01N 11/00 700/265 |
| 8,960,990 B2 * | 2/2015 | Koehler | B28C 7/026 366/61 |
| 8,989,905 B2 * | 3/2015 | Sostaric | B01F 15/00207 700/265 |
| 9,789,628 B2 * | 10/2017 | Chun | B28C 7/022 |
| 9,789,629 B2 * | 10/2017 | Koehler | G05D 21/02 |
| 10,183,418 B2 * | 1/2019 | Jordan | B28C 7/026 |
| 2007/0185636 A1 * | 8/2007 | Cooley | B28C 5/422 701/50 |
| 2008/0060556 A1 | 3/2008 | Jacquet et al. | |
| 2008/0316856 A1 * | 12/2008 | Cooley | B28C 5/422 366/142 |
| 2009/0037026 A1 * | 2/2009 | Sostaric | B01F 15/00207 700/265 |
| 2011/0029134 A1 * | 2/2011 | Hazrati | B28C 7/026 700/265 |
| 2011/0077778 A1 * | 3/2011 | Berman | B28C 7/02 700/265 |
| 2011/0088599 A1 * | 4/2011 | Koyata | C04B 20/023 106/803 |
| 2011/0320040 A1 * | 12/2011 | Koehler | C04B 40/0032 700/265 |
| 2012/0016523 A1 * | 1/2012 | Koehler | G01N 11/00 700/265 |
| 2012/0204625 A1 | 8/2012 | Beaupre | |
| 2012/0252953 A1 | 10/2012 | Kuo et al. | |
| 2014/0107844 A1 * | 4/2014 | Koehler | G05D 21/02 700/265 |
| 2015/0065614 A1 | 3/2015 | Kuo et al. | |
| 2015/0133584 A1 | 5/2015 | Kuo et al. | |
| 2016/0355441 A1 * | 12/2016 | Tregger | B28C 7/024 |
| 2017/0087743 A1 * | 3/2017 | Roberts | F24F 3/0442 |

OTHER PUBLICATIONS

Copenheaver, Form PCT/ISA/237, Written Opinion of the International Searching Authority for PCT/US2016/035221, dated Sep. 14, 2016, 4 pages.

* cited by examiner

POST-BATCHING CMA DOSING INTO CONCRETE

FIELD OF THE INVENTION

This invention relates to the treatment of clay-bearing aggregates used in concrete, and, more particularly, to an automated concrete delivery monitoring process and system for controlled post-batching addition of an agent for mitigating the deleterious effect of clay on dosage-efficiency of chemical admixtures and/or water which are administered into the concrete load.

BACKGROUND OF THE INVENTION

In U.S. Pat. Nos. 6,352,952 and 6,670,415 (owned by W. R. Grace & Co.-Conn.), Jardine et al. disclosed that dosage efficiency of dispersants used in concrete can be diminished by the presence of clay. It was discovered that oxyalkylene polymers, used for dispersing cement particles within concrete, tended to be absorbed by clay particles that were born or conveyed by the sand and/or other aggregates used in making the concrete.

Jardine et al. proposed to mitigate this clay problem by deploying certain compounds, which, in the manner of sacrificial agents, became absorbed by the clay particles which would have otherwise absorbed the oxyalkylene cement dispersant molecules and rendered them unavailable to function as cement particle dispersant within the concrete mix.

The present inventors refer herein to clay activity-modifying agents, otherwise called clay mitigation agents, using the acronym "CMA(s)."

Jardine et al. taught that the order of addition of a CMA depended on the chemical nature of the CMA. Thus, if the CMA contained cation or polar organic molecules, the CMA was preferably added to the clay before water was introduced to the clay (See U.S. Pat. No. 6,670,415, Abstract, lines 14-16).

For CMAs having very high affinity for clay, such as quaternary amines (e.g., poly-quaternary amines), Jardine et al. described that such CMAs were to be added to the clay-bearing aggregate before, during, or after water was introduced (See U.S. Pat. No. 6,670,415 at Abstract, lines 16-20), and/or they could be added simultaneously with or before the cement dispersant was added (See U.S. Pat. No. 6,670,415 at col. 6, lines 48-58).

In U.S. Pat. No. 8,257,490 B2 (owned by Lafarge S. A.), Jacquet et al. taught the use of inerting agents which were preferably to be added to clay-bearing sand at the quarry or at the ready-mix plant, preferably to the sand first to prevent excessive use of a superplasticizer.

The concept of treating aggregates at quarries using CMAs was further emphasized in Ser. No. 14/395,603 (US Publ. No. 2015/0065614) and Ser. No. 14/378,158 (US Publ. No. 2015/0065614), co-owned by W. R. Grace & Co.-Conn.

Until the present invention, it was generally believed that the most effective mode for adding CMAs was directly onto clay-bearing aggregates either at the quarry or at the ready-mix plant before mixing the aggregate with water and/or cement dispersant. This separate and prior addition would avoid any competition between CMAs, on the one hand, and water and/or the cement dispersant on the other hand.

Even if the cement dispersant had far lower clay affinity compared to the CMAs, this separate and prior addition of CMAs was preferred because the over-riding objective was to maximize the rheological performance and strength of the concrete.

Also fundamental to the conventional thinking was the assumption that adsorption by the clay of CMAs is irreversible. It made sense, then, for purposes of expediting the concrete delivery process, to introduce the CMA first to the clay-bearing aggregate or concrete before introducing the cement dispersant into the concrete mix.

However, the present invention changes this conventional thinking in fundamentally unexpected ways.

SUMMARY OF THE INVENTION

In surmounting the disadvantages of prior art approaches, the present invention provides an automated concrete delivery monitoring process and system for achieving post-batching dosing, during transit from the mix plant where the concrete is initially batched, to the construction site, of a concrete mix having clay born by aggregates, of at least one clay mitigation agent (CMA), whereby a desired workability and a dosage-efficiency of chemical admixture(s) (and/or water) during transit are achieved.

The present inventors were surprised to discover that the dosage-efficiency of controlled additions of water, cement dispersant, air entraining admixture, air detraining admixture, or other chemicals into the concrete mix during transit can be diminished or otherwise deleteriously affected by the presence of clay in the concrete mix, even if the clay is initially treated with CMA before the ready-mix truck leaves the mix plant to embark on the transport phase of the delivery to the job site.

The present inventors were further surprised to discover that post-batching addition of CMA (during transport) can be comparably more efficient in terms of the total volume dosed compared to administering the CMA in a one-time, upfront dose at the batch mix plant before the transit phase. Efficiency is measured with a view to the total dosage amounts of CMAs, water, dispersant, air entraining admixture, air detraining admixture, or other chemical admixtures required to be administered to maintain certain concrete properties or performance parameters (e.g., slump or other rheological value, air content, etc.) during the concrete manufacture and delivery operation.

An exemplary method of the invention for dosing concrete, comprises: monitoring the slump, on an automated basis using a processor unit, of a concrete slurry while in a rotatable mixer drum during transit from a mix plant to a construction site to which the concrete slurry is being delivered, the concrete slurry comprising a cement binder, water, aggregate, and clay which, in the absence of a clay mitigation agent, absorbs chemical admixture, and which is present in the concrete slurry in an amount sufficient to diminish the dosage efficiency of a cement dispersant or other chemical admixture added into the concrete slurry; wherein the automated slump monitoring processor unit (i) measures loss of slump (dS) of the concrete slurry in the rotatable mixer drum over a period of time (t) during transit to obtain a measured dS/dt value, (ii) compares the measured dS/dt value with a threshold dS/dt value stored in a memory location which is accessed by the processor unit, and (iii) detects when the measured dS/dt value meets or exceeds the stored threshold dS/dt value; and whereupon the processor unit, once the measured dS/dt value meets or exceeds the stored dS/dt threshold value, initiates administration of a controlled dosage of clay mitigation agent (CMA) into the concrete within the rotatable mixer drum during transit, the CMA administered being effective to decrease the dS/dt value as measured by the automated slump processor unit.

The threshold dS/dt value that is stored in memory and used by the processor unit for initiating CMA addition during transit may be selected by the user, such as based on empirical evidence or personal experience with the estimated amount of CMA needed to treat a certain kind of clay-bearing aggregate as used for a given concrete batch. For example, dosage of CMA can be manually determined based on methylene blue value (MBV) measurement as known in the industry (see e.g., ASTM C1777-14), or using automated MBV measurement on aggregate that is conveyed by belt or other continuous method into a bin or truck (See e.g., U.S. Pat. No. 8,561,488). Clay contents can change drastically and randomly within a given aggregate source over time. Furthermore, concrete plants often use several sources of aggregates, a practice that tends to undermine any ability to keep track of clay content on a truck-by-truck basis. Because the amount of clay is usually not known, the ability to dose CMA(s) during the batch process accurately is severely hindered.

Alternatively, the dS/dt value can be calculated and/or adjusted by the automated slump monitoring system processor unit during transit based on historical slump data as monitored by the system. For example, automated slump monitoring systems, such as available from VERIFI LLC, can be programmed to consider any number of variables, such as the nature of the clay born by the aggregate material, nature and reactivity of the cement, ambient temperature, concrete temperature, and other factors.

The slump of the concrete slurry may also be monitored and adjusted by taking into consideration the air content as well as the dispersant and/or air control agent administered into the concrete mix (See e.g., U.S. Pat. Nos. 8,491,717 and 8,764,273 of Koehler and Roberts (owned by W. R. Grace & Co.-Conn.)).

In further exemplary methods of the invention, the slump monitoring processor unit repeats steps (i), (ii) and (iii) whereby clay mitigation agent is administered into the concrete on at least two different instances during transit.

In still further exemplary methods, the slump monitoring computer processor initiates administering clay mitigation agent (CMA) into the concrete, whereby at least 21% and up to 100%, more preferably at least 51% and up to 100%, and most preferably at least 81% and up to 100%, of the total volume of CMA dosed into the concrete slurry is dosed during transit rather than at the mix plant where the concrete was batched into the rotatable mixing drum.

In further exemplary embodiments, the post-batching addition or additions of CMAs into the concrete slurry during transit may be accompanied by addition of chemical admixture (e.g., cement dispersant, in particularly a superplasticizer) into the concrete slurry. Such a simultaneous addition mode can be done where the affinity for clay (or rate of adsorption onto the clay) of the CMA is much higher compared to the chemical admixture. In another exemplary embodiment, the post-batching CMA additions can be separate from and precede the subsequent addition of water and/or chemical admixture (e.g., cement dispersant, air control admixture, or a mixture of these) into the concrete. Where the post-batching separate addition(s) of CMA and chemical admixture or water are repeated, it is preferred to allow the mixer drum to rotate sufficiently to allow the CMA dose (or any other chemical admixture previously dosed) to be completely mixed into the concrete and absorbed onto the clay particles within the concrete mix (hereinafter referred to as "staggered" addition).

The present invention also provides an automated concrete monitoring system for achieving the above described post-batching CMA addition process. For example, the above method may be programmed into slump control systems which are commercially available from Verifi, LLC, a subsidiary of W. R. Grace & Co.-Conn., Cambridge, Mass., USA.

The present inventors contemplate that the above post-batching addition(s) of CMAs (in this case during post-batch concrete or mortar mixing) can be applied as well to stationary mixers, such as pan mixers used in the precast or pre-stressed concrete industries, to prolong slump or other performance parameter. Hence, exemplary methods and systems of the invention comprise having at least one instance of post-batching addition of CMAs in a mixer (such as a stationary mixer in a precast concrete plant or pre-stressed concrete plant), whereby at least 21% and up to 100%, more preferably at least 51% and up to 100%, and most preferably at least 81% and up to 100%, of the total volume of CMA(s) dosed into the concrete is added to the concrete after initial batching of water, cement binder, and clay-bearing aggregates to form the concrete slurry.

Further advantages and benefits of the invention are described in further detail hereinafter.

BRIEF DESCRIPTION OF THE DRAWINGS

Further advantages and features of the present invention may be more readily comprehended when the following detailed description of exemplary embodiments is taken in conjunction with the appended drawings, wherein.

DETAILED DESCRIPTION OF EXEMPLARY EMBODIMENTS

The present invention provides automated concrete monitoring method and system for mitigating or otherwise avoiding the deleterious effects of clay on the dosage efficiency of chemical admixtures, such as cement dispersants (also referred to as water-reducers or superplasticizers), air control agents (including air entraining admixtures, air detraining admixtures), water, and mixtures thereof, which are administered into a concrete mix that is being transported from a ready-mix plant (where the concrete components are batched into the rotatable mixer drum of the delivery truck) to a construction site at which the concrete mix is delivered (poured). The clay present in the concrete is born or conveyed by the sand aggregates or other aggregate, such as crushed stone, rock, and/or gravel, used for making the concrete.

The terms "transit" and "transport" are used to refer to the phase of the delivery operation after batching of the components to form the concrete slurry in the ready-mix delivery truck (which has a rotatable mixer drum) and up to the pour event when the concrete batch mix is discharged from the mixer drum at the construction site to which the concrete mix is being delivered.

While the method of the invention involving post-batching CMA dosing can also be practiced using stationary mixers as would be employed in the pre-cast and pre-stressed concrete industries, it is believed that most significant impact of the present invention would be felt in the ready-mix concrete industry, because the cumulative shearing energy that is imposed upon the clay particles contained in the concrete rotating in the mixing drum during transit is the greater cause for concern with respect to achieving dosage efficiency of expensive high range water reducers (HRWR) known as superplasticizers.

The present invention relates to treatment of all types of clays. The clays may include but are not limited to swelling clays of the 2:1 type (such as smectite type clays) or also of type 1:1 (such as kaolinite) or of the 2:1:1 type (such as chlorite). The term "clays" has referred to aluminum and/or magnesium silicates, including phyllosilicates having a lamellar structure; but the term "clay" as used herein may also refer to clays not having such structures, such as amorphous clays.

The present invention is also not limited to clays which absorb polyoxyalkylene superplasticizers (such as ones containing ethylene oxide ("EO") and/or propylene oxide ("PO") groups), but it also includes clays that directly affect the properties of construction materials, whether in their wet or hardened state. Clays which are commonly found in sands include, for example, montmorillonite, illite, kaolinite, muscovite, and chlorite. These are also included in the methods and compositions of the present invention.

Clay-bearing sands and/or crushed rock or gravel which are treated by the method of the present invention may be used in cementitious materials, whether hydratable or not, and such cementitious materials include mortar, concrete, and asphalt, which may be used in structural building and construction applications, roadways, foundations, civil engineering applications, as well as in precast and prefabrication applications.

The term "sand" as used herein shall mean and refer to aggregate particles usually used for construction materials such as concrete, mortar, and asphalt, and this typically involves granular particles of average size between 0 and 8 mm, preferably between 2 and 6 mm. Sand aggregates may comprise calciferous, siliceous or siliceous limestone minerals. Such sands may be natural sand (e.g., derived from glacial, alluvial, or marine deposits which are typically weathered such that the particles have smooth surfaces) or may be of the "manufactured" type, which are made using mechanical crushers or grinding devices.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed stone, rock, gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., Concrete Admixtures (Van Nostrand Reinhold, New York N.Y. 1990), page 1.

The term "concrete" will be used herein generally to refer to a hydratable cementitious mixture comprising water, cement, sand, usually a coarse aggregate such as crushed stone, rock, or gravel, and optional chemical admixture(s).

It is contemplated that one or more conventional chemical admixtures may be used in the methods and compositions of the present invention. These include, without limitation, water reducing agents (such as lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarders; set accelerators; air entraining agents; air detraining agents (also known as defoamers); surface active agents; and mixtures thereof.

Of the admixtures, the EO-PO type polymers, which have ethylene oxide ("EO") and/or propylene oxide ("PO") groups and polycarboxylate groups, are preferred. Cement dispersants contemplated for use in methods and compositions of the invention include EO-PO polymers and EO-PO comb polymers, as described for example in U.S. Pat. No. 6,352,952 B1 and U.S. Pat. No. 6,670,415 B2 of Jardine et al., which mentioned the polymers taught in U.S. Pat. No. 5,393,343 (assigned to W. R. Grace & Co.-Conn.). These polymers are available from W. R. Grace & Co.-Conn., Massachusetts, USA, under the trade name ADVA®. Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. Nos. 5,661,206 and 6,569,234. These are conventionally referred to as polycarboxylate ("PC") type cement dispersants. The amounts of such PC dispersants used within concrete may be in accordance with conventional use (e.g., 0.05% to 0.25% based on weight of active polymer to weight of cementitious material).

The term "clay mitigating agents" or CMAs will be used herein generally to refer to chemicals that (1) have an affinity to clay particles within an aqueous environment (e.g., the CMA attaches physically and/or chemically to the clay particle); (2) have the ability to mitigate (e.g., inert, diminish, attenuate, avoid) negative effects of clay on the dosage-efficiency and/or performance of the hydratable cementitious composition; and (3) have minimal or no water-reducing capability within a hydratable cementitious slurry or paste environment on its own (in the absence of clay which would otherwise absorb water or chemical dispersant). The present inventors, by employing the concept "minimal or no water-reducing capability," are defining CMAs in contrast to and contradistinction with conventional water-reducers, particularly mid-range water reducers (MRWR) and high-range water reducers (HRWR) including so-called superplasticizers (which are usually defined as being effective to replace 12% or more of water while achieving the same slump).

Quantitatively, CMAs can be defined for purposes of the present invention as having minimal or no water-reducing capability and to have 0-10% and more preferably 0-5% capability to reduce water requirements of hydratable cementitious compositions such as concrete. In other words, CMAs as contemplated in this invention would not fit into the standard specification for HRWRs as defined in ASTM C494-13 (and would be preferably far below the minimum 12% water reducing capability as conventionally understood in the concrete industry).

While generally described by U.S. Pat. Nos. 6,352,952 and 6,670,415, CMAs contemplated as suitable for use in the present invention may include inorganic cations, organic cations, polar organic molecules capable of being absorbed by the clay, clay dispersants (such as a polyphosphate), or mixtures thereof. As another example, in U.S. Pat. No. 8,257,490), in U.S. patent application Ser. No. 11/575,607 (Publ. No. 2008/0060556 A1) and in World Intellectual Property Organization Application (Publ. No. 2010/112784 A1) (owned by Lafarge S. A.), Jacquet et al. disclosed compositions for "inerting" clays in aggregates which included quaternary amine functional groups such as diallyldialkyl ammonium, quaternized (meth)acrylates of dialkylaminoalkyl and (meth)acrylamides N-substituted by a quaternized dialkylaminoalkyl. Also included were cationic polymers obtained by polycondensation of dimethylamine and epichlorohydrin. Still other examples include functionalized (poly)amines, such as those described World Intellectual Property Organization Application (Publ. No. 2009/127893 A1) (owned by S. P. C. M. SA), carboxylate graft polymers with a weight-average molecular weight of 70-250,000 and a molar ratio of carboxylic acid to polyoxyalkylene groups less than 2 (See e.g., US Patent Publ. No. 2015/0133584, co-owned by W. R. Grace & Co.-Conn. and L'Beste GAT, Ltd.), cationic copolymers made from two or more monomers, such as those described in U.S. Pat. No. 8,461,245 (owned by W.R. Grace & Co.-Conn.) and U.S. patent application Ser. No. 13/076,944 (Publ. No. 2012/0252953 A1), a chemical compound formed by a hydrophobic compound with at least one group reactive with isocynates, a hydrophilic compound with at least one group reactive with isocynates and a last compound with at least two reactive isocyanate groups as described in World Intellectual Property Organization Application (Publ. No. 2010/040796 A1) (owned by Construction Research & Technology GMBH).

Automated slump monitoring systems for monitoring and adjusting concrete slump which are deemed suitable for use in the present invention are commercially available from Verifi LLC, a subsidiary of W. R. Grace & Co.-Conn., 62 Whittemore Avenue, Cambridge, Mass. USA.

Slump monitoring systems are variously disclosed in the patent literature authored by Verifi LLC. These include U.S. Pat. No. 8,118,473 of Compton et al.; U.S. Pat. No. 8,020,431 of Cooley et al.; U.S. Pat. No. 8,491,717 of Koehler et al.; U.S. patent application Ser. No. 10/599,130 of Cooley et al. (Publ. No. US 2007/70185636 A1); U.S. patent application Ser. No. 11/834,002 of Sostaric et al. (Publ. No. US 2009/0037026 A1); and U.S. patent application Ser. No. 258,103 of Koehler et al. (Publ. No. 2012/0016523 A1). The slump monitoring systems operate by correlating the energy required to rotate the concrete mix in the drum (using sensors on the pressure charge and discharge values on the ready-mix delivery truck as well as drum rotation sensor) and comparing monitored values with information and/or data stored in memory. The systems allow for controlled addition of water and/or chemical admixture into the concrete in the rotatable mixer drum.

While the present inventors contemplate that it may be possible to employ other slump monitoring devices, such as stress/strain probe sensors as described in WO 2011/042,880 and US 2012/0204625A1 owned by I.B.B. Rheologie Inc. or US 2011/0077778A1 of Sensocrete, to achieve controlled post-batching CMA additions during transit (mixing) based on the teachings disclosed herein, the inventors prefer hydraulic pressure measurement.

Exemplary systems of the present invention may be obtained by programming automated slump monitoring systems such as commercially available from Verifi LLC to perform the methods taught herein by the present inventors.

An exemplary method of the invention for dosing concrete, comprises: monitoring the slump, on an automated basis using a processor unit, of a concrete slurry while in a rotatable mixer drum during transit from a mix plant to a construction site to which the concrete slurry is being delivered, the concrete slurry comprising a cement binder, water, aggregate, and clay which, in the absence of a clay mitigation agent, absorbs chemical admixture, and which is present in the concrete slurry in an amount sufficient to diminish the dosage efficiency of a cement dispersant or other chemical admixture added into the concrete slurry; wherein the automated slump monitoring processor unit (i) measures loss of slump (dS) in the concrete slurry in the rotatable mixer drum over a period of time (t) during transit to obtain a measured dS/dt value, (ii) compares the measured dS/dt value with a threshold dS/dt value stored in a memory location which is accessed by the processor unit, and (iii) detects when the measured dS/dt value meets or exceeds the stored threshold dS/dt value; and whereupon the processor unit, once the measured dS/dt value meets or exceeds the stored dS/dt threshold value, initiates administration of a controlled dosage of clay mitigation agent (CMA) into the concrete within the rotatable mixer drum during transit, the CMA administered being effective to decrease the dS/dt value as measured by the automated slump processor unit.

During longer distances from the batch mix plant to the delivery (pour) site, it could be more preferably for the slump monitoring processor unit to repeat steps (i), (ii) and (iii) whereby clay mitigation agent (CMA) is administered into the concrete on at least two or more different instances staggered during transit (of the concrete transported from mix plant to construction/delivery site).

The term "staggered" as used herein means and refers to at least two additions of CMA separated by time. Depending on the nature of the mix components or chemicals, the time between additions could require one or several complete drum rotations before complete mixing of the CMA is achieved before the concrete can be effectively monitored and subsequently dosed.

While it is contemplated that a portion of the CMA (along with any other chemical admixture and water) can be administered into the batch mix that is introduced into the rotatable mixer drum of the concrete truck at the mix plant, the present inventors prefer to add at least the majority, if not most or all, of the CMA into the concrete load during transit (during the period that delivery truck leaves the mix plant and heads for the construction site to which the concrete is being delivered).

Thus, in exemplary embodiments of the invention, the slump monitoring computer processor initiates administering clay mitigation agent (CMA) into the concrete, whereby at least 21% and up to 100%, more preferably at least 51% and up to 100%, and most preferably at least 81% and up to 100%, of the total volume of CMAs dosed into the concrete slurry is dosed during transit rather than at the mix plant where the concrete was batched into the rotatable mixing drum (e.g., as one or more "post-batching" addition(s)).

In other exemplary embodiments, a portion of the cumulative total amount of CMA added into a given concrete load contained in the mixer drum is added at the mix plant, the portion being added at the batch plant preferably comprising no greater than 79%, more preferably no greater than 49%, and most preferably no greater than 19% (or even none) of the cumulative total amount of CMA administered into the particular batched concrete mix being delivered.

As will be shown in the Examples that follow, it was unexpected and surprising for the present inventors to discover that the total cumulative amount of CMA administered into a given batched concrete mix could be reduced through post-batching dosages administered at staggered intervals during (transit).

In other embodiments of the invention, the present inventors prefer to take the hydration state of the concrete into account, so that the system can more accurately monitor for loss in slump (dS) over time (t) due to clay effect. One way of tracking the concrete hydration state is to measure the temperature of the concrete mix within the rotatable mixer drum, as the hydration behavior of the concrete is reflected in its exothermic behavior, and to adjust the threshold dS/dt that is stored in a processor accessible memory location. Thus, in further exemplary methods and systems of the invention, the concrete dosing method further comprises measuring temperature of the concrete slurry during transit and obtaining temperature data, and adjusting the stored threshold dS/dt value based on the obtained temperature data.

Further exemplary methods and systems of the invention further comprise measuring air content of the concrete slurry during transit and obtaining air content data, and adjusting the stored threshold dS/dt value based on the obtained air content data. For example, the entrained air content of concrete slurries may be measured using sonar-based air measurement products commercially available from CiDRA, Wallingford, Conn., under the AIRtrac™ product name.

The term "slump" is used herein refers to measurement of the vertical drop of concrete in inches using a standard 12-inch slump cone, as known in the concrete art, but it would be evident to the average concrete artisan that this term could refer to other rheological parameters of the concrete, such that this term could refer to "slump flow" referring to horizontal spread of highly fluid concrete released on a steel plant when released from an inverted cone. See e.g., U.S. Pat. No. 8,818,561 of Koehler et al., owned by VERIFI LLC, a subsidiary of W. R. Grace & Co.-Conn.

The rotatable concrete mixer drums employed in the automated monitoring methods and systems of the invention should preferably have an inner wall upon which are spirally-mounted at least two mixing blades for agitating the concrete slurry during rotation of the mixer drum, and thereby effective for mixing water and/or chemical admixtures into the concrete load. The post-batching CMA additions taught by the present invention may be administered simultaneously with at least one other chemical admixture (e.g., cement dispersant, preferably with a superplasticizing admixture such as a polycarboxylate type), and such simultaneous administrations of the chemicals should be spaced apart in time corresponding to a duration which is at least the time it takes for the mixer drum to mix completely the chemicals uniformly throughout the concrete being mixed.

While it is perhaps most convenient to administer the CMA and another chemical admixture such as a cement dispersant simultaneously through post-batching additions, it is possible, where separate tanks and dispensing system are used, to inject CMA separately from other the other chemical admixture(s). Thus, in another exemplary embodiment of the invention, after one or more post-batching CMA additions into the concrete slurry, the automated slump monitoring processor unit initiates one or more controlled additions of water, at least one chemical admixture, or a mixture thereof into the concrete slurry.

In further exemplary embodiments, the concrete dosing method and system employ the automated slump monitoring processor unit to initiate separate additions of a controlled amount of at least one other chemical admixture (in addition to the CMA) into the concrete slurry, the at least one chemical admixture being selected from the group consisting of cement dispersant (most preferably a superplasticizer), an air entraining admixture, an air detraining admixture, or a mixture thereof.

In exemplary methods and systems of the invention, the CMA used for post-batching dosing during transit of the concrete slurry is preferably selected from the group consisting of quaternary amines and polyquaternary amines and derivatives thereof; polycondensates of dimethylamine and epichlorohydrin; carboxylate graft polymers; functionalized (poly)amines, or a mixture thereof. Examples of suitable CMA chemistries include the quaternary amine compounds described in U.S. Pat. Nos. 6,352,952 and 6,670,415 (owned by W. R. Grace & Co.-Conn.), and in U.S. Pat. No. 8,257,490, Ser. No. 11/575,612 (Publ. No. 2007/0287794 A1), U.S. patent application Ser. No. 11/575,607 (Publ. No. 2008/0060556 A1) and World Intellectual Property Organization Application (Publ. No. WO2010/112784 A1) (owned by Lafarge S. A.). Suitable CMAs based on polycondensates of dimethylamine and epichlorohydrin and functionalized (poly)amines are described in WO2009/127893 A1 (owned by SNF SAS and SPCM SA). Other suitable CMA chemistry includes carboxylate graft polymers as described in U.S. Pat. No. 8,461,245 (owned by W.R. Grace & Co.-Conn.) and U.S. patent application Ser. No. 13/076,944 (Publ. No. 2012/0252953 A1). Another suitable CMA is a carboxylate graft polymer as described in U.S. Patent Publ. No. US 2015/0133584 (co-owned by W. R. Grace & Co.-Conn. and L'Beste GAT LTD.). Another CMA is a functionalized polyamine formed by reacting amine compound with an epoxy compound as described by Kuo et al. in US 2015/0065614 (co-owned by W. R. Grace & Co.-Conn.). Another suitable CMA is formed by a hydrophobic compound with at least one group reactive with isocyanates as described in WO 2010/040796 A1 (owned by Construction Research & Technology GMBH).

In further concrete dosing methods and systems of the invention, the slump values over time (e.g., the transit history) of the concrete slurry (i) before and after at least two additions of CMAs into the concrete slurry; (ii) before and after at least two additions of at least one chemical admixture into the concrete slurry, and (iii) the transit histories of both (i) and (ii), may be stored into memory locations which are accessible by the processor unit. The transit histories of both (i) and (ii), for example, may be graphically illustrated on the screen or monitor of a laptop or palm device such as a smart phone, in the manner illustrated in FIGS. 1-3. Behavior of the concrete after addition of a CMA can be viewed as shown in FIG. 4.

In further exemplary monitoring methods and systems of the invention, the processor unit which monitors the concrete may be programmed to incorporate various other additional processes to ensure accurate readings of the slump over time so that subtle gradations in the change of slump over time can be detected and acted upon.

For example, process steps for checking hydration factors, such as temperature, which affect the concrete slump may be taken into consideration to increase accuracy of detecting for loss in concrete slump over time (dS/dt value).

As another example, process steps for monitoring air content of the concrete slurry also can be taken into consideration, as a decrease in slump may correspond with a decrease in the air content in the concrete, although general practice in the concrete industry suggests that finding a reliable correspondence between slump and air content is not always the case. However, in U.S. Pat. Nos. 8,491,717 and 8,764,273 (owned by W. R. Grace & Co.-Conn.), Koehler and Roberts disclosed a system for simultaneously tracking dosing of both rheology-modifying admixtures (e.g., polycarboxylate polymer cement dispersant) and air control agents (e.g., air entraining agents). Hence, further exemplary processes and systems of the present invention comprise monitoring of both dispersant and air control agent dosing in connection with administering CMA into the concrete load.

An exemplary procedure for taking into consideration temperature, air content factors, or both, when monitoring a concrete slurry load and administering CMA into the concrete is described in the following steps. The system is programmed to measure the slump of the concrete load, compare this to a "target" slump that has been inputted by the user into the automated slump monitoring system, and the difference between the measured slump and "target" slump is compared so that the system can automatically begin a succession of process steps depending upon whether the difference exceeds a "slump tolerance" value that is predetermined by the user or programmer of the system, the later succession of steps being triggered when the rate of slump loss exceeds a predetermined threshold:

a. Measure slump of the concrete slurry.
b. If Target slump—Measured slump> Slump tolerance (e.g. 0.5"), continue to Step (c), otherwise return to Step (a).
c. Measure slump loss rate.
d. If Slump loss rate—Target slump loss rate> Slump loss rate tolerance (e.g., 1"/hr threshold), continue to Step (e), otherwise, skip to Step (n).
e. Measure concrete temperature and rate of change of temperature.
f. If the temperature and rate of change do not indicate slump loss caused by hydration, continue to step (g).
g. Measure concrete air and rate of change of air.
h. If the air and rate of change do not indicate slump loss caused by air, continue to step (i).
i. If CMA dose count in current step exceeds maximum allowed (e.g. 3 times), skip to Step (n), otherwise continue to step (j).
j. Add CMA dose (e.g. based on clay content measured by MBV or based on adjustment of previous dose). Increase CMA dose count by one.
k. Wait X number of drum revolutions, based on time required to mix CMA completely into concrete.
l. Measure slump loss rate.
m. If slump loss rate does not decrease, increase CMA dose to be administered and return to step (j).
n. Add high range water reducer to bring slump within slump target and continue to step (o).
o. Wait Y number of revolutions, based on time required to mix dispersant into truck load of concrete and return to Step (a).

In a still further embodiment of the invention, the automated slump system is programmed to monitor for slump gain in the concrete slurry after a polycarboxylate high range water reducing admixture has been administered into the concrete slurry contained in the mixer drum, such that when the processor unit detects that the monitored slump does not increase as would otherwise be expected for the amount of HRWR administered, the processor unit can be programmed to adjust the threshold value (dS/dt) or to adjust (e.g., to increase) the amount of CMA to be administered into the mixer drum, or both. Thus, a further exemplary process of the present invention further comprises: adding a polycarboxylate high range water reducing (HRWR) admixture into the concrete slurry during transit; monitoring for an increase in the slump of the concrete slurry (dS) over a period of time immediately following addition of the polycarboxylate high range water reducing admixture to obtain a dS value for the period after said addition of the HRWR; and comparing the obtained dS value with a second threshold dS value stored in a memory location which is accessed by the processor unit; detecting when the obtained dS value fails to meet or exceed the stored second threshold dS value stored in the memory location; and, upon detection that the second threshold dS value is not met, adjusting the stored threshold dS/dt value described in (ii) of claim 1, adjusting the controlled dosage of clay mitigation agent (CMA) to be administered into the concrete slurry, or both.

An automated slump monitoring system can be programmed in the manner described above to adjust the CMA detection threshold and/or the amount of CMA dosage to be administered into the mixer drum, so as to prevent the further adsorption to clay of the PC dispersant. Preferably, an indication or alarm would be initiated by the automated slump monitoring processor to the operator, a central control office (for the concrete mixer truck or slump monitoring system), to alert someone to the fact that the given concrete batch load had required this correction.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

All parts and percentages in the examples, as may be set forth herein and hereinafter, are by percentage dry weight unless otherwise specified.

Example 1

In this example, a high-range water reducing concrete mix design was used containing 371 kg/m$^3$ of cement, 860 kg/m$^3$ of sand, 1009 kg/m$^3$ of stone, 0.2% solids/sand of a sodium montmorillonite clay, 178 kg/m$^3$ of water, 0.14% solids/cement of a high range water reducer (HRWR), and 8% solids/clay of a clay mitigating agent (CMA). The HRWR is commercially available from Grace Construction Products, Cambridge Mass., USA, under the ADVACAST® 575 trademark.

The mixing protocol was performed in a laboratory-scale pan mixer using 0.0396 m$^3$ of concrete. First, stone, sand and water was mixed for 1 minute at a high speed; then cement was added and mixed for 1 minute at high speed; then the HRWR+CMA was added and mixed for 2 minutes at high speed. After the initial mixing cycle, the concrete was tested for the slump. After testing, the concrete was mixed for an additional 5 minutes at high speed and an addition of chemical was made. The concrete was mixed for another 2 minutes at high speed and tested for slump. This process was repeated two more times for a total of four chemical additions and corresponding slump measurements.

In the first example, the amount of each addition of chemical for the first case was 0.026% solids/cement of HRWR only with 50 grams of rinse water. In the second and third cases, the amount of each addition was the same amount of HRWR but with an additional 1.5% solids/clay amount of CMA. Two different CMAs were used for the second and third cases. The first CMA was a carboxylate graft polymer with a weight-average molecular weight of 70-250,000 and a molar ratio of carboxylic acid to polyoxyalkylene groups less than 2 (See e.g., US Patent Publ. No. 2015/0133584 (co-owned by W. R. Grace & Co.-Conn. and L'Beste GAT, Ltd.); while the second CMA was functionalized (poly)amine, such as those described World Intellectual Property Organization Application (Publ. No. WO 2009/127893 A1) (owned by S. P. C. M. SA).

Figure 1:
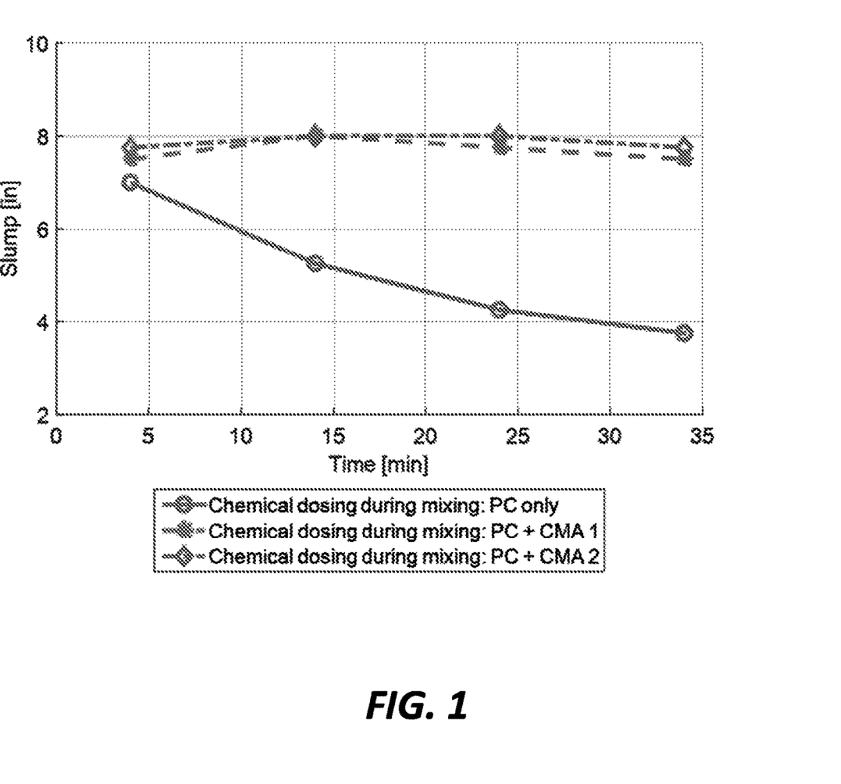
FIG. 1 is a graphic illustration of slump (inches) over time (minutes) of three concrete mixes, two of which (shown in dotted lines) were treated by post-batching additions during mixing of CMA(s) and "PC" dispersant according to the teachings of the present invention (the mixing period approximating delivery transit time), but one of which (shown in solid line) was treated according to the prior art approach wherein dispersant alone is added during mixing.

The results are plotted as slump (inches) versus time (minutes) and shown in FIG. 1.

The time of the additions of chemicals was at 14 minutes, 24 minutes and 34 minutes. As shown in FIG. 1, supplementing each PC addition with either CMA after initial mixing surprisingly improves the slump and thus the efficiency of the HRWR. Without being tied to theory, the present inventors believe that this suggests that during the concrete mixing process, more clay surfaces are formed due to the high shearing forces occurring within the agitated concrete slurry, especially as it is believed that CMA 1 and CMA 2 do not have cement dispersing capabilities on their own. Furthermore, both types of CMA chemistries demonstrate the similar behavior, further pointing to a clay phenomena; not one that is chemistry specific.

Example 2

In this example, the same mix design and mixing protocol was used. However the initial CMA used was different depending on the case. Case 1—0.13% solids/cement of HRWR and 8% solids/clay of CMA 2 upfront, 0.026% solids/cement of HRWR during subsequent additions (No CMA w/additions during mixing). Case 2—0.13% solids/cement of HRWR and 8% solids/clay of CMA 2 upfront, 0.026% solids/cement of HRWR and 1.5% solids/clay of CMA 2 during subsequent additions. Case 3—0.13% solids/cement of HRWR and 12.5% solids/clay of CMA 2 upfront, 0.026% solids/cement of HRWR during subsequent additions (No CMA w/additions during mixing). Case 3 represents the total amount of CMA 2 added in Case 2, but added upfront and not with additions during mixing.

Figure 2:
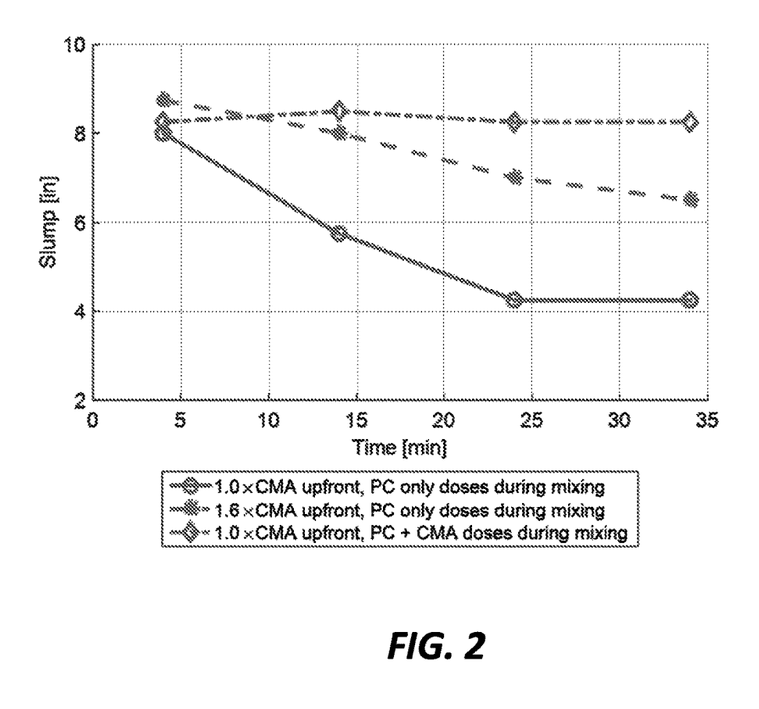
FIG. 2 is a graphic illustration of the slump over time of concrete mixes dosed upfront (before mixing period which approximates a delivery transit time) with CMA followed by additions of dispersant alone (illustrated by the two downward sloping curves) compared to slump/time behavior of concrete dosed according to teaching of the invention whereby CMA and dispersant are dosed at staggered points during mixing to maintain relatively constant slump/time behavior.

The results are plotted as slump (inches) versus time (minutes) and shown in FIG. 2.

The time of the additions of chemicals was at 14 minutes, 24 minutes and 34 minutes, respectively. As seen previously, the addition of CMA after initial mixing surprisingly improves the slump and thus the efficiency of the HRWR. Additionally, it is preferred that the CMA addition be made after initial batching (and thus not as an upfront addition) (comparing Cases 2 and 3).

Example 3

In this example, the same mix design was used but with a different mixing protocol. An alternative to dosing chemical every ten minutes, the torque required to rotate the laboratory mixer was monitored over time. As the slump decreases, more torque is required. Dosages were administered if the torque level exceeded a given limit corresponding to a given slump. Therefore, slump is maintained after a certain time, with the dosage being variable for different methods.

Three different dosing protocols were compared. For all three protocols, a HRWR dose of 0.12% solids/cement was used upfront. The first protocol involved an upfront dose of CMA 1 of 10% solids/clay. Subsequent doses were kept constant, but delivered at different times depending on when the torque level exceeded 53% (% of rated torque of the motor). These additions consisted of a HRWR dose of 0.01% solids/cement and a CMA 1 dose of 0.8% solids/clay. The second protocol involved an upfront dose of CMA 1 of 16% solids/clay. This corresponded to the total amount of CMA 1 used in the first protocol. Subsequent doses involved only a HRWR dose of 0.01% solids/cement (no CMA w/additions during mixing). The last protocol involved no upfront dose of CMA 1. In subsequent additions, a HRWR dose of 0.01% solids/cement and a CMA 1 dose of 0.8% solids/clay was used, similar to the first protocol.

Figure 3:
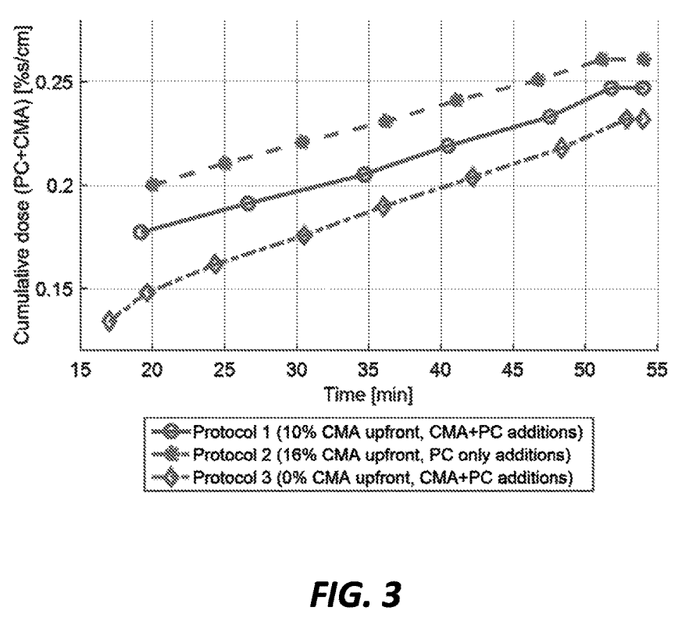
FIG. 3 is a graphic illustration of two exemplary methods of the present invention (Protocols 1 and 3) wherein staggered additions of CMA resulted in relatively lower cumulative dosage amount compared to a prior art method illustrated by uppermost dotted line curve wherein a relatively large CMA dose was administered upfront only and dispersant alone was dosed during mixing.
Figure 4:
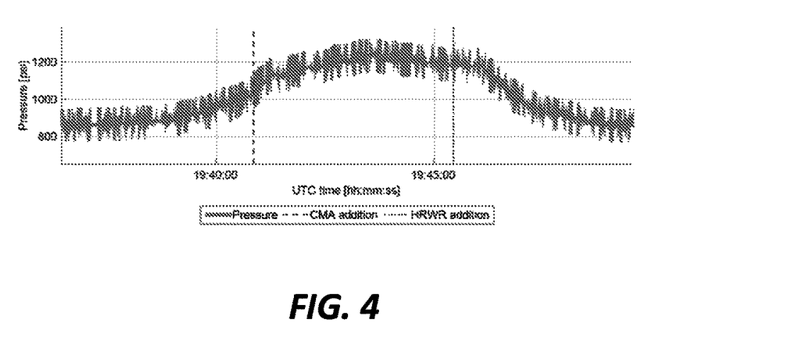
FIG. 4 is a graphic illustration of an exemplary method of the invention wherein CMA addition during mixing of concrete containing a dispersant was shown to arrest and reverse slump loss.

The cumulative dosage amounts (converted to solids/cement) of the chemical admixture as introduced into the concrete over time are plotted and shown in FIG. 3.

At the end of the 54 minutes, the slump was measured. All three protocols had the same slump. As can be seen, while all three protocols maintain the same end slump, the last protocol, where all of the CMA is added during only the mixing period gives the most efficient use of the total amount of the chemical added. In this case, there is an 11% reduction in terms of total chemical added using staggered addition protocol of the present invention when compared to the prior art method of adding CMA upfront only (i.e., not during the transport of the concrete).

Example 4

As a final example, a field test was performed with a 7.65 cubic meter ready-mix concrete truck equipped with the Verifi® slump monitoring system which is commercially sourced by Verifi LLC (a division of Grace Construction Products, 62 Whittemore Avenue, Cambridge, Mass. USA).

The point of the test was to demonstrate that adding the CMA after batching can influence the rate of slump loss. A high-range water reducing concrete mix design was used containing 357 kg/m$^3$ of cement, 89 kg/m$^3$ of fly ash, 1053 kg/m$^3$ of sand, 696 kg/m$^3$ of stone, 153 kg/m$^3$ of water and 0.15% solids/cement of a cement dispersant in the form of a high range water reducer (HRWR). The sand was tested according to ASTM C1777, which determines Na-montmorillonite equivalent clay content based on absorption of methylene blue. The sand contained approximately a 1.0% Na-montmorillonite equivalent clay content. No clay mitigating agent was dosed upfront during the batching process.

The truck was batched with a majority of the water followed by stone and the sand, followed by the cement and fly ash and finally the HRWR with the remaining water. After batching, the drum speed was set to 3 rpm. Through the VERIFI® monitoring system, both the normalized pressure (which is the difference between the hydraulic charge pressure and hydraulic discharge pressure) and the drum speed were monitored.

As shown in FIG. 4, after approximately 25 minutes after batching the concrete (UTC time=19:38), the normalized hydraulic pressure required to rotate the concrete mix began to rise, signifying an increase in slump loss. At UTC time=19:41, 1.89 liters of CMA 1 was added to the drum. This would be approximately 1.3% solids/clay (initial clay content). As a result, the rate of pressure increase (i.e. slump loss) was decreased and the pressure actual began to decrease. The CMA 1 was able to influence the slump loss rate. According to the method invented, at UTC=19:45, a cement dispersant (e.g., the HRWR) was added to bring the slump to the proper target. The system is programmed to monitor the concrete slump and detect when a desired slump target is not met.

It is clear from FIG. 4 that adding a CMA during mixing can slow down and even reverse slump loss.

The foregoing examples and embodiments were presented for illustrative purposes only and not intended to limit the scope of the invention.

It is claimed:

1. A method for dosing concrete, comprising:
monitoring the slump, on an automated basis using a processor unit, of a concrete slurry while in a rotatable mixer drum during transit from a mix plant to a construction site to which the concrete slurry is being delivered, the concrete slurry comprising a cement binder, water, aggregate, and clay which, in the absence of a clay mitigation agent, absorbs chemical admixture, and which clay is present in the concrete slurry in an amount sufficient to diminish the dosage efficiency of a cement dispersant or other chemical admixture added into the concrete slurry;
wherein the processor unit
(i) measures loss of slump (dS) of the concrete slurry in the rotatable mixer drum over a period of time (t) during transit to obtain a measured dS/dt value,
(ii) compares the measured dS/dt value with a threshold dS/dt value stored in a memory location which is accessed by the processor unit, and
(iii) detects when the measured dS/dt value meets or exceeds the stored threshold dS/dt value; and
whereupon the processor unit, once the measured dS/dt value meets or exceeds the stored dS/dt threshold value, initiates administration of a controlled dosage of clay mitigation agent (CMA) into the concrete within the rotatable mixer drum during transit, the CMA administered being effective to decrease the dS/dt value as measured by the processor unit.

2. The concrete dosing method of claim 1 wherein the processor unit initiates repeating-of-steps (i), (ii) and (iii) whereby the controlled dosage of the clay mitigation agent is administered into the concrete on at least two staggered instances during transit.

3. The concrete dosing method of claim 2 wherein the processor unit initiates administering the controlled dosage of the clay mitigation agent (CMA) into the concrete, whereby at least 21% and up to 100% of the controlled dosage of the total volume of CMA dosed into the concrete slurry is dosed during transit rather than at the mix plant where the concrete was batched into the rotatable mixing drum.

4. The concrete dosing method of claim 2 wherein the processor unit initiates administering the controlled dosage of the clay mitigation agent (CMA) into the concrete, whereby at least 51% and up to 100% of the controlled dosage of the total volume of CMA dosed into the concrete slurry is dosed during transit rather than at the mix plant where the concrete was batched into the rotatable mixing drum.

5. The concrete dosing method of claim 2 wherein the processor unit initiates administering the controlled dosage of the clay mitigation agent (CMA) into the concrete, whereby at least 81% and up to 100% of the controlled dosage of the total volume of CMA dosed into the concrete slurry is dosed during transit rather than at the mix plant where the concrete was batched into the rotatable mixing drum.

6. The concrete dosing method of claim 2 wherein, after each of the at least two post-batching doses of CMA into the concrete slurry, the processor unit initiates additions of a controlled amount of water or at least one chemical admixture other than a CMA into the concrete slurry.

7. The concrete dosing method of claim 6 wherein the processor unit initiates separate additions of a controlled amount of at least one chemical admixture into the concrete slurry, the at least one chemical admixture being selected from the group consisting of cement dispersant, air entraining admixture, air detraining admixture, and a mixture thereof.

8. The concrete dosing method of claim 7 further comprising storing into processor unit-accessible memory the transit history of the concrete slurry (i) before and after the at least two additions of CMA into the concrete slurry; (ii) before and after the at least two additions of the at least one chemical admixture into the concrete slurry, and (iii) the transit histories of both (i) and (ii).

9. The concrete dosing method of claim 8 wherein the processor unit initiates graphically illustrating the transit histories of both (i) and (ii).

10. The concrete dosing method of claim 1 wherein the processor unit initiates administering into the concrete during transit at least one other chemical admixture, in addition to the controlled dosage of the CMA, on at least two different instances during transit.

11. The concrete dosing method of claim 10 wherein the at least one other chemical admixture is a cement dispersant selected from a mid-range water reducer or high-range water reducer.

12. The concrete dosing method of claim 11 wherein the processor unit initiates dosing of the cement dispersant simultaneously with initiating the controlled dosing of the CMA on at least two staggered instances during transit.

13. The concrete dosing method of claim 11 wherein the processor unit initiates dosing of the cement dispersant after initiating controlled dosing of the CMA during at least two staggered instances during transit.

14. The concrete dosing method of claim 1 wherein the processor unit initiates measuring temperature of the concrete slurry during transit and obtaining temperature data, and adjusting the stored threshold dS/dt value based on the obtained temperature data.

15. The concrete dosing method of claim 1 wherein the processor unit initiates monitoring of air content of the concrete slurry during transit and obtaining air content data, and initiates adjustment of the stored threshold dS/dt value based on the obtained air content data.

16. The concrete dosing method of claim 1 wherein the rotatable mixer drum has an inner wall upon which are spirally-mounted at least two mixing blades for agitating the concrete slurry during rotation of the mixer drum.

17. The concrete dosing method of claim 1 wherein the CMA is selected from the group consisting of a quaternary amine, polyquaternary amine, polycondensate of dimethylamine and epichorohydrin, functionalized amine, carboxylate graft polymers, cationic copolymers, and mixtures and derivatives thereof.

18. The concrete dosing method of claim 1 wherein a portion of the cumulative total amount of CMA added into a given concrete load contained in the mixer drum is added at the mix plant, the portion being added at the batch plant comprising no greater than 49 percent of the cumulative total amount of CMA.

19. The concrete dosing method of claim 1 wherein the CMA has minimal or no water-reducing capability by itself in the absence of clay when administered alone into a fresh concrete (in accordance with standard specification for water reducers in ASTM C494-13).

20. The concrete dosing method of claim 1 wherein the processor unit initiates
- adding a polycarboxylate high range water reducing (HRWR) admixture into the concrete slurry during transit;
- monitoring for an increase in the slump of the concrete slurry (dS) over a period of time immediately following addition of the polycarboxylate high range water reducing admixture to obtain a dS value for the period after said addition of the HRWR; and
- comparing the obtained dS value with a second threshold dS value stored in a memory location which is accessed by the processor unit;
- detecting when the obtained dS value fails to meet or exceed the stored second threshold dS value stored in the memory location; and, upon detection that the second threshold dS value is not met,
- adjusting the stored threshold dS/dt value described in (ii) of claim 1, adjusting the controlled dosage of clay mitigation agent (CMA) to be administered into the concrete slurry, or both.

* * * * *